United States Patent [19]
Hench

[11] 4,243,181
[45] Jan. 6, 1981

[54] GRANULATION OF MATERIALS

[75] Inventor: Hans H. W. Hench, Grossostheim, Fed. Rep. of Germany

[73] Assignee: Automatik Apparate-Machinenbau H. Hench GmbH, Ostring, Fed. Rep. of Germany

[21] Appl. No.: 938,793

[22] Filed: Sep. 1, 1978

Related U.S. Application Data

[63] Continuation of Ser. No. 801,656, May 31, 1977, abandoned.

[30] Foreign Application Priority Data

May 31, 1976 [DE] Fed. Rep. of Germany ....... 2624415

[51] Int. Cl.² ............................................. B02C 18/22
[52] U.S. Cl. .................................. 241/142; 83/356.3; 241/151; 241/222
[58] Field of Search ................ 241/101 D, 101.6, 135, 241/136, 142, 151, 221–223; 83/355, 356.3, 580

[56] References Cited

U.S. PATENT DOCUMENTS

| | | | |
|---|---|---|---|
| 1,484,585 | 2/1924 | Thaler | 241/136 X |
| 3,224,687 | 12/1965 | Bidwell | 241/136 X |
| 3,708,129 | 1/1973 | Nowak | 241/222 X |
| 3,960,334 | 6/1976 | Wudyka | 241/222 X |
| 3,976,254 | 8/1976 | Hench et al. | 241/222 |
| 4,000,860 | 1/1977 | Gotham | 241/222 X |

FOREIGN PATENT DOCUMENTS 2308981 9/1974 Fed. Rep. of Germany .......... 241/222

*Primary Examiner*—Howard N. Goldberg
*Attorney, Agent, or Firm*—George E. Kersey

[57] ABSTRACT

Granulation of materials, particularly materials in stranded form, employing a rotatable cutter with multiple feed channels at different elevational positions along the periphery of the cutter. The granules of the feed material formed by the cutter are collected without further, unwanted cutting by using a separate, pressurizable discharge channel for each feed channel or by providing voids in the cutter through which the granules can fall, desirably with the assistance of feed channel applied pressure.

12 Claims, 6 Drawing Figures

GRANULATION OF MATERIALS

The present application is a continuation of Ser. No. 801,656 filed May 31, 1977, now abandoned.

BACKGROUND OF THE INVENTION

This invention relates to the granulation of materials and more particularly to the granulation of materials using elongated rotating cutters.

The granulation of materials using an elongated rotating cutter is illustrated in prior U.S. Pat. No. 3,837,586 which issued Sept. 24, 1974 to Perschbacher et al. It is desirable in such an arrangement to produce granules at the highest possible rate. One way of attempting to increase the rate is to increase the rate at which material is fed to the cutter. This requires a corresponding increase in the number of revolutions of the cutter and of the rollers that are commonly used to feed the material. There is, however, a limitation to the rotational velocity of the cutter because of wear and noise considerations. In addition, certain plastic materials, particularly highly viscous synthetics, permit only limited discharge speeds because of adverse sheer effects that take place within outlets at elevated speeds.

To increase production within the foregoing velocity limitations, it is customary to increase the axial length of the cutter to increase the amount of material that can be supplied and cut simultaneously. This, however, makes each cutter long, heavy and expensive. The apparatus which incorporates the cutter is, in turn, unwieldly, bulky and difficult to control, particularly in the adjustment of the cutting head.

Accordingly, it is an object of the invention to facilitate the granulation of materials, particularly materials in stranded form.

Another object of the invention is to increase the rate at which granules can be produced by a machine with a cutter of prescribed axial length operating at a specified rotational speed.

A further object of the invention is to increase the rate of granulation without the need for changing the speed of the cutter or of increasing its axial length.

SUMMARY OF THE INVENTION

In accomplishing the foregoing and related objects, the invention provides a plurality of feed channels which are angularly offset relative to one another with respect to a rotating cutter. Provision os made for the collection of the granules thus produced without multiple cutting.

The invention permits multiple utilization of a single cutter by supplying materials through different feed channels that are angularly displaced with respect to one another. As a result a single cutter can operate in more than one plane and thus exploit a plurality of laterally extending regions of the cutter. This permits a single cutter to provide the same production output as a plurality of cutters operating at the same rotational speed.

In accordance with one aspect of the invention, unwanted further cutting of the granules from a particular channel is avoided by associating it with a separate collection channel. This not only tends to prevent the granules of a particular channel from further unwanted contact with cutting surfaces at other locations, it makes it possible for a single machine to produce granules of different sizes without undesired intermixing of the different sized granules. Thus, the cutter at one level of feed can provide granules of a first size while the same cutter at a different level of feed can provide granules of a different size. In each case the granules that are formed can be carried by respective channels to separate outlet positions.

It is a consequence of the invention that even where only two feed channels are employed, the rate of granulation can be double that of a granulating system which employs the same axial length of cutter operating at the same rotational speed. As a result the invention has important economic consequences.

Where a separate discharge channel is employed for the granules of each feed channel, the discharge channel is advantageously formed as a collector pocket which faces the cutter and extends laterally beyond the ends of the cutter into a discharge chute. Each collector pocket can be formed as a recess in the cutter housing and can carry a counterstructure against which the knife of the cutter acts to produce the desired granules. The discharge of the granulated material from the collector pockets can be promoted by connecting the pockets to a pressure source. Where gas is employed, suitable expansion can be provided by widening the collector pockets in the direction of flow of the granulated material.

Repeated cutting of granulated material from an upper feed channel by the side of the associated collector pocket facing the cutter can be avoided by shaping the lower side of the collector pocket as a lip that extends so closely to the cutter that the granulated material is directed to the base of the pocket by the lip. The granulated material obtained during cutting is propelled away from the teeth of the cutter because of their rotational speed and may impinge upon the lip which in turn causes it positively to pass into the respective lateral chute.

It is feasible to have the collector pockets open at both sides of the cutting roller into the respective lateral chutes. Yet it is also possible to connect the collector pockets alternatingly at one side, beside the cutting roller, to the respective lateral chute. If the granulating process produces only one certain granulated material, the lateral chutes will be connected to the main chute which will thus take up the granulated material from all feed channels. However, it is also possible to conduct the lateral chutes independently of the main chute so that granulated material is obtained separately from each feed channel.

The discharge channel employed may also be a free space provided behind the knives in the interior of the cutting roller. This means, of course, that a special cutting roller has to be provided which disposes of the required free space. The passing of the granulated material into the free space can be enhanced by associating pressure channels with the strand free channels to permit entry of a flow medium which will flow in the direction toward the free space, entraining the granulated material on its way. The granulated material will then drop from the free space into the main chute disposed below the free space.

DESCRIPTION OF THE DRAWINGS

In order that the invention may be clearly understood and readily carried into effect several embodiments will now be described, by way of example, with reference to the accompanying drawings, in which.

DETAILED DESCRIPTION

Figure 1:
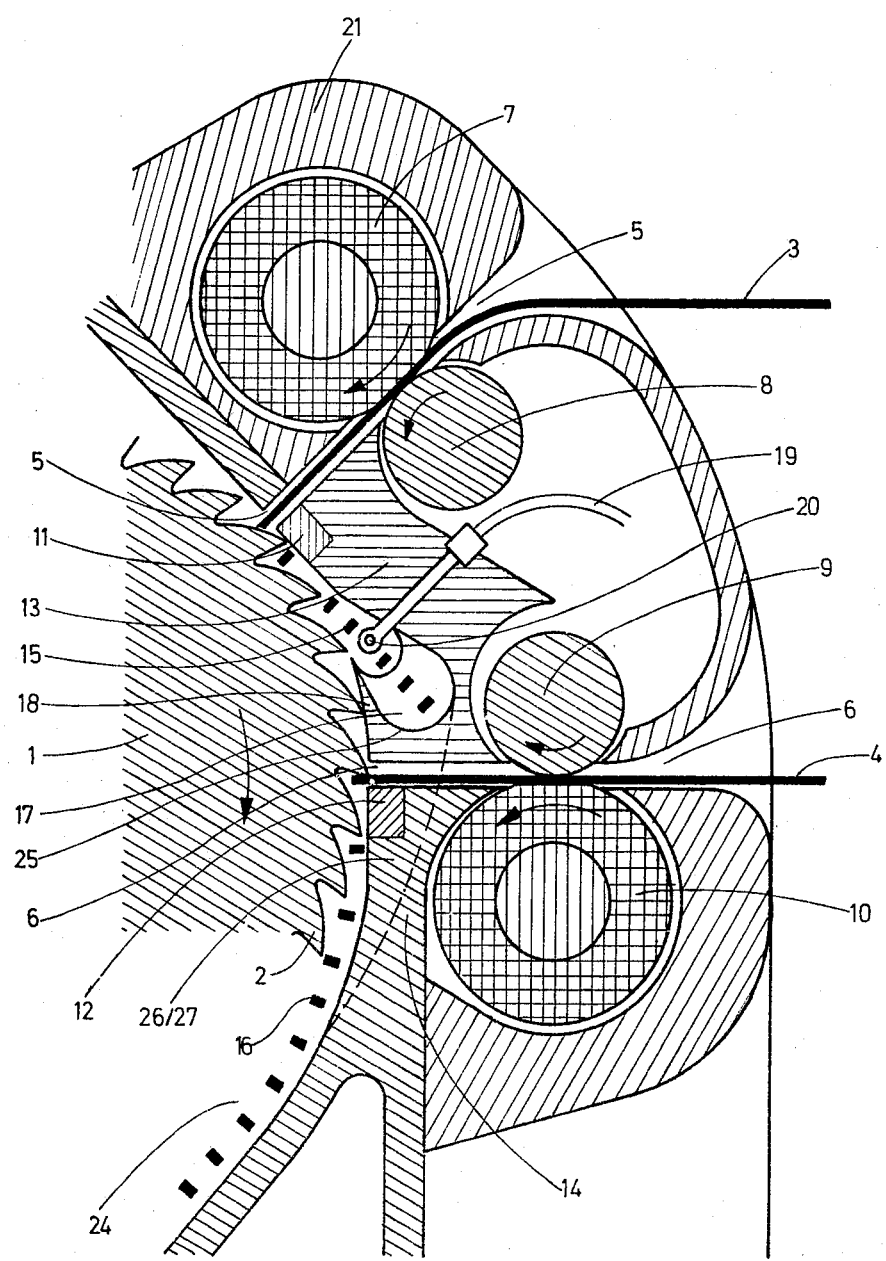
FIG. 1 is a sectional elevation transversely of the axis of the cutting roller of an apparatus having two feed channels.

The apparatus shown in FIG. 1 comprises a cutting roller 1 having teeth 2. Strands 3 and 4 are supplied to the cutting roller through feed channels 5 and 6. A feed means is associated with each of the two feed channels 5 and 6. It consists of feed rollers 7/8 and 9/10. In per se known manner the feed rollers 7, 8, 9, 10 effect the advance of the strands 3 and 4 to the cutting roller 1 at a certain speed. Counterknives 11 and 12, respectively, are coordinated with each feed channel 5 and 6, respectively. The counterknives are supported by blocks 13 and 14, respectively. Each block 13 and 14 is inserted in per se known manner in the housing structure. The teeth 2 and the counterknives 11 and 12, respectively, cooperate to cut the strands 3 and 4 into granulated material 15 and 16, respectively. Below feed channel 5 there is a collector pocket 17 to collect the granulated material 15. The collector pocket is constituted by a recess formed in block 13. The collector pocket 17 serves to pass away the granulated material 15 cut from strand 3 so that it cannot get to the second cutting location between the teeth 2 and the counterknife 12 were it might be cut once more. Provision is also made so that the granulated material 15 does not get between the teeth 2 and the wall of the collector pocket 17 facing the cutting roller 1. For this purpose this wall of collector pocket 17 is formed as a lip 18 which extends in such close proximity to the cutting roller 1 that the granulated material 15 is directed to the bottom of collector pocket 17 by lip 18.

Positive passage of the granulated material 15 through the collector pocket 17 and out of the same is obtained by connecting collector pocket 17 to a pressure gas source which supplies pressurized gas through hose 19 to nozzle 20 from which the pressurized gas issues in axial direction of the cutting roller 1 toward both sides, as will be explained in more detail in connection with FIG. 2. It is also possible to use a liquid, especially water as the flow medium instead of pressurized gas.

In the apparatus described above double use is made of the cutting roller 1 which is utilized so to speak in two planes without any possibility for the granulated material from one plane to be passed on to another subsequent cutting location. Therefore, in each case granulated material of defined size is produced.

Figure 2:
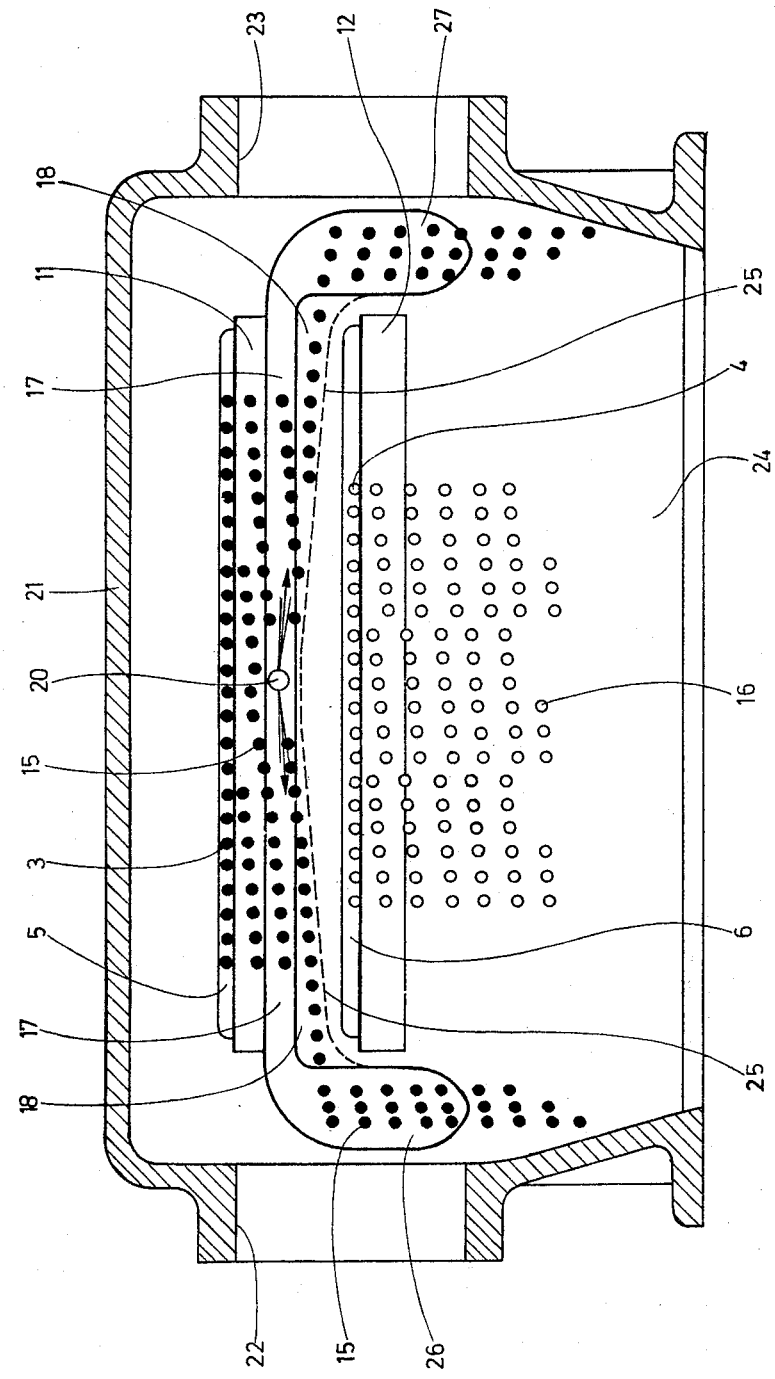
FIG. 2 is sectional elevation of the housing along the axis of the cutting roller, but now showing the cutting roller.

FIG. 2 shows the apparatus according to FIG. 1 in a sectional elevation along the axis of the cutting roller 1 which, however, is left out of the illustration of FIG. 2 for reasons of clarity. FIG. 2 only shows a housing 21 with two bearing take-up positions 22 and 23 for the shaft of the cutting roller. In addition, the counterknives 11 and 12 and the collector pocket 17 as well as the flow of the granulated material are shown.

Strands 3 and 4 are advanced in feed channels 5 and 6, respectively, and are cut at the counterknives 11 and 12, respectively, to form granulated material 15 and 16, respectively. The granulated material 16 falls directly into main chute 24, whereas the granulated material 15 reaches collector pocket 17. The granulated material 15 is held away from the cutting roller 1 by lip 18 which directs the material to the bottom 25 (discontinuous line) of collector pocket 17. It may be gathered from FIG. 2 that from the center of collector pocket 17 the bottom 25 is outwardly inclined toward the sides so that a progressive enlargement of collector pocket 17 to the outside is obtained. This makes it easier for the gas supplied under pressure through nozzle 20 to expand in collector pocket 17 and carry along the granulated material 15. Moreover, this constant enlargement of collector pocket 17 makes it possible to guide the granulated material 15, which grows constantly in amount, away from collector pocket 17 without any damming up or obstruction. The nozzle 20 arranged in the middle of collector pocket 17 passes the pressurized gas with which it is supplied toward both sides in the direction of the arrows shown in the drawing so that the granulated material 15 is pressed away from the center to both sides. At the lateral ends of collector pocket 17 the granulated material 15 is passed onto lateral chutes 26 and 27 which open into the main chute 24 at these locations. Thus the granulated material 15 and the granulated material 16 meet and are finally discharged by main chute 24. However, it should be noted that the lateral chutes 26 and 27 may also be extended separately so as to permit separate discharge of the respective granulated materials.

In FIG. 1 the lateral chutes 26 and 27 are shown by a discontinuous line leading away from the bottom 25 of collector pocket 17. The reference line marked 26/27 is extended into the area laterally of said discontinuous line.

Figure 3:
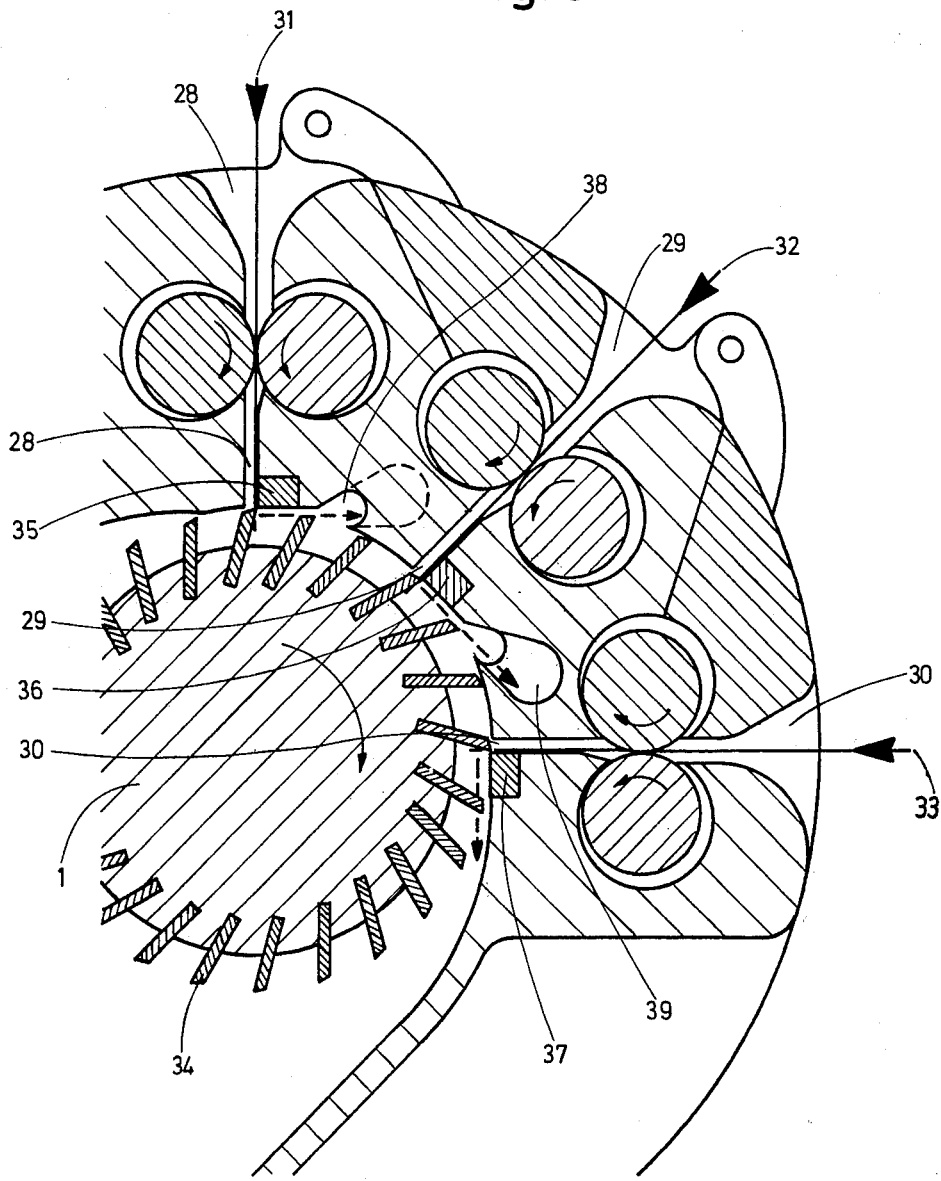
FIG. 3 is a sectional elevation transversely of the axis of the cutting roller of an apparatus having three feed channels.

The apparatus shown in FIG. 3 comprises three feed channels 28, 29, and 30 through which strands 31, 32, and 33 are advanced to cutting roller 1 which in this case is provided with inserted knives 34. This is so to speak a three-level apparatus. The functioning of the feed rollers shown in FIG. 3 in the range of feed channels 28, 29, and 30 need not be explained in detail since this function was explained already in connection with FIG. 1. The apparatus shown in FIG. 3 comprises three counterknives 35, 36, and 37. Furthermore, collector pockets 38 and 39 are shown which in this case serve for one-sided discharge of the respective granulated material.

Figure 4:
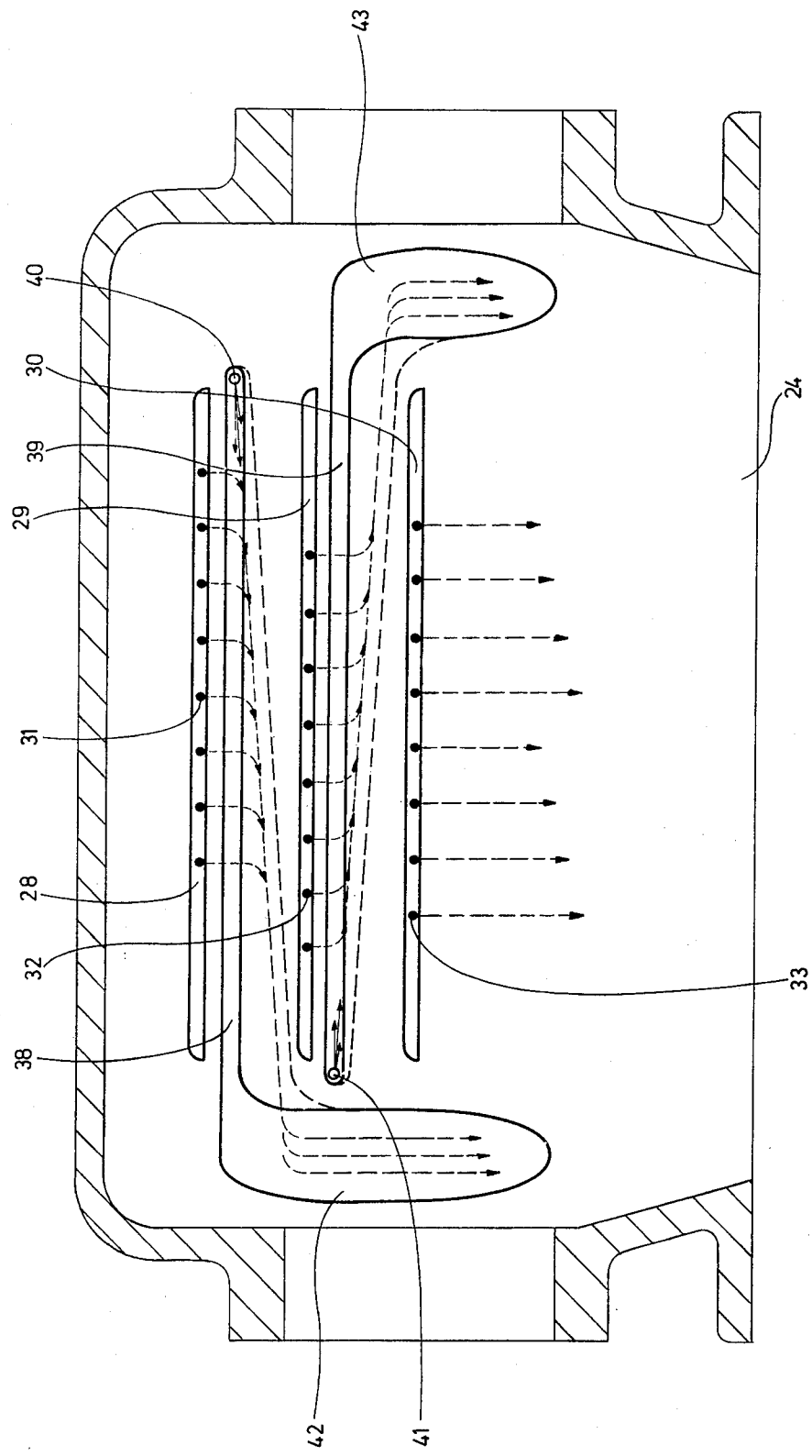
FIG. 4 is a sectional elevation of the housing of the apparatus shown in FIG. 3 in the longitudinal direction of the cutting roller, but not showing the cutting roller.

In FIG. 4 the apparatus according to FIG. 3 is shown in sectional elevation along the axis of cutting roller 1 which is not itself shown. Other than with the apparatus according to FIGS. 1 and 2 the granulated material produced in the two upper levels is discharged at one side. For this purpose collector pocket 38 is provided at its rear end with a pressure gas nozzle 40, while collector pocket 39 is provided at its rear end with pressure gas nozzle 41. The granulated material is each conveyed in the direction of the discontinuous lines and the respective arrows shown in the drawing, namely from collector pocket 38 into lateral chute 42 and from collector pocket 39 into lateral chute 43. The two lateral chutes 42 and 43 finally open into main chute 24.

Figure 5:
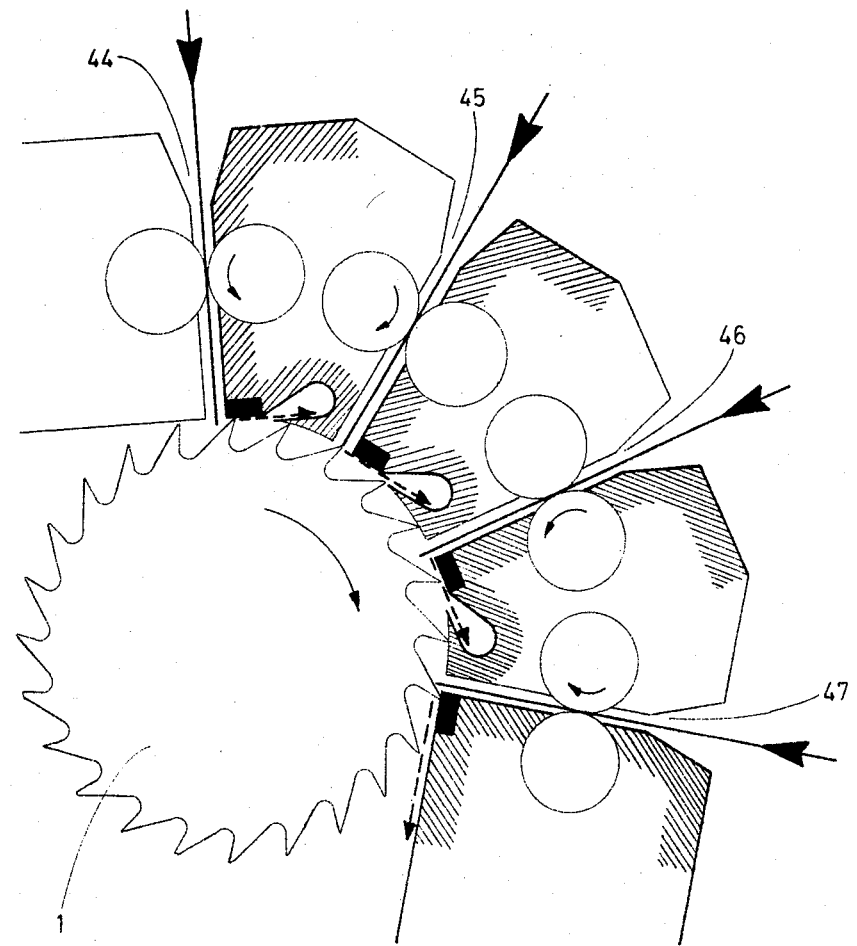
FIG. 5 is a fundamental illustration of an apparatus having four feed channels.

FIG. 5 shows another embodiment within admission to the cutting roller 1 through four feed channels 44, 45, 46, and 47. In this connection it is not necessary to deal in detail with the further structural elements since these elements and their functioning correspond to the embodiments already described. However, FIG. 5 shows quite clearly that the principle according to the invention readily makes it possible to obtain multiplication of the performance as to the rate of granulation in comparison with known arrangements.

Figure 6:
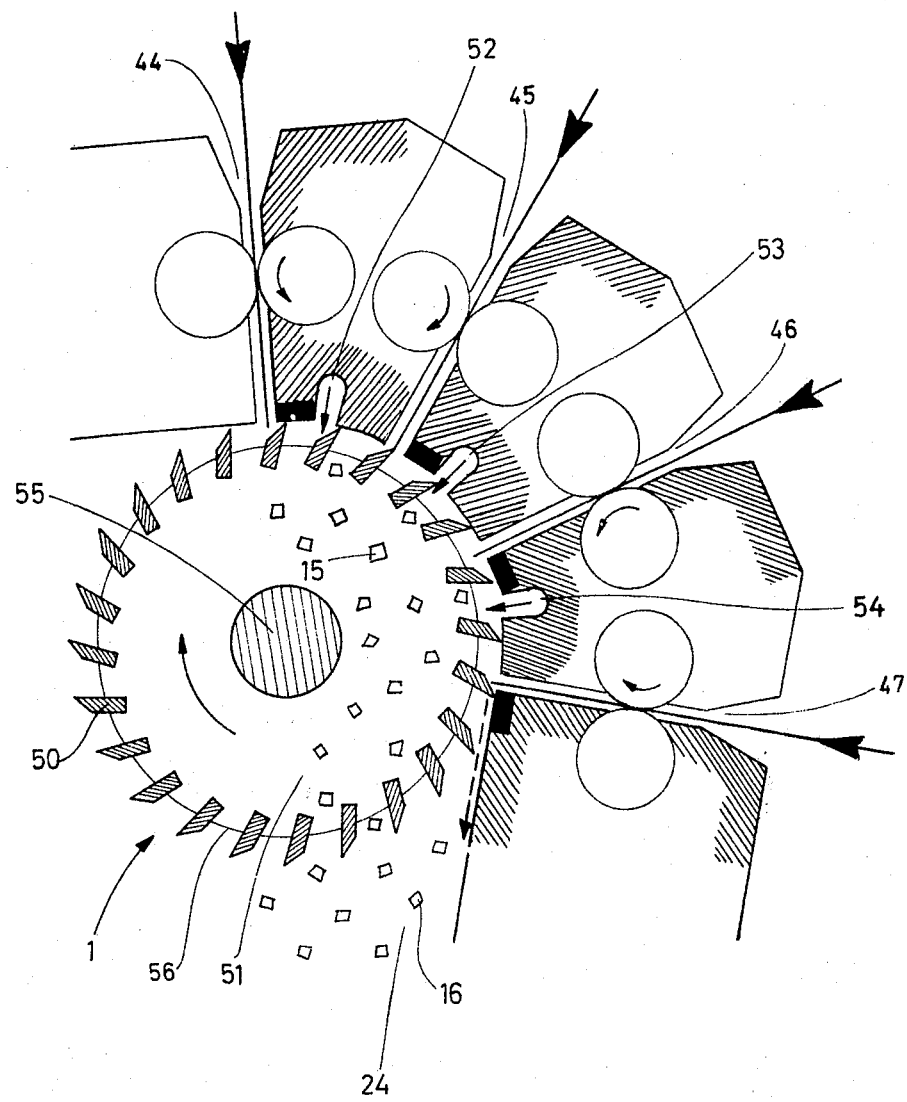
FIG. 6 is an embodiment of an apparatus including a cutting roller which has a free space in its interior serving as discharge channel.

In the case of the embodiment shown in FIG. 6 the discharge channel for the granulated material 15 consists of the free space 51 which exists behind the knives 50 in the interior of the cutting roller 1. The granulated material 15 originating from feed channels 44, 45, and 46 is passed into this free space 51 and then drops into the main chute 24 under its own gravity. If the granulated material should again come into contact with a knife 50 before it reaches the main chute 24, it is simply propelled away from the cutting roller 1 by the knife and will finally end up in the main chute 24 anyway. It is only the granulated material 16 which comes from feed channel 47 which is directly conveyed downwardly into the main chute 24, as is the case with known granulating devices. With this kind of discharge of the granulated material there is no need for special collector pockets, such as shown especially in FIG. 1. However, it was found to be of advantage to provide pressure channels 52, 53, and 54 approximately at the location of the collector pockets. Through these channels a flow medium may be introduced in the direction toward the free space 51. This flow medium, especially air or water will entrain the granulated material 15 cut off by knife 50 with particular intensity toward the interior into free space 51 so that there is no longer any tendency for the granulated material to be taken along by the respective cutting knife 50 and perhaps be cut again at the respective successive cutting point.

The cutting roller 1 shown in FIG. 6 is a known embodiment. The individual knives 50 are carried between two outwardly disposed discs which are supported by shaft 55. The knives 50, for instance, may be clamped between the discs. They may also be attached to the discs from the outside by screw connections. Such structures are known. In FIG. 6 one disc 56 is shown, whereas the second disc is not visible because of the sectional representation.

In the embodiment shown in FIG. 6 the opening of each pressure channel 52, 53, and 54 is disposed below the respective feed channel 44, 45, and 46. However, it is possible as well to have the pressure channels open into the feed channels 44, 45, and 46, respectively, at a location downstream of the respective feed rollers (not marked by reference numerals in FIG. 6). In that event the specific openings shown in the figure for pressure channels 52, 53, and 54 may be eliminated. If the pressure channels are designed to open into feed channels 44, 45, and 46, it is convenient to arrange correspondingly directed nozzles for the flow medium in the feed channels, each at a location downstream of the respective feed rollers. With such an arrangement the flow medium which is directed from the feed channels 44, 45, and 46 toward the knives 50 at once carries along the granulated material into the free space 51 inside the cutting roller 1. Then the granulated material is passed into the main chute 24 in the manner described above.

It will be understood that while the invention has been shown and described in a preferred form, changes may be made without departing from the scope of the invention as defined in the following claims.

What is claimed is:

1. Apparatus for granulating materials, which comprises
    a rotatable cutter having a cylindrical periphery with cutting blades thereon:
    a plurality of separate channels for feeding materials to the cylindrical periphery of said cutter, said channels being angularly offset relative to one another about the cylindrical periphery of said cutter;
    and means for limiting the further unwanted cutting of materials cut by said cutter, comprising a separate discharge channel associated with each of the feed channels.

2. Apparatus as defined in claim 1 wherein each said discharge channel includes a collector pocket extending laterally beyond said cutter and opening into a lateral chute.

3. Apparatus as defined in claim 2 wherein said collector pocket is formed by a recess in the housing of said cutter.

4. Apparatus as defined in claim 2 wherein said collector pocket is connected to a flow medium source to convey the granulated material.

5. Apparatus as defined in claim 2 wherein the collector pocket is widened in the direction of the flow of the granulated material.

6. Apparatus as defined in claim 2 wherein the side of the collector pocket facing the cutter is formed into a lip which is located to direct the granulated material to the bottom of the collector pocket.

7. Apparatus as defined in claim 2 wherein the collector pocket opens at both sides of the cutter into respective lateral chutes.

8. Apparatus as defined in claim 7 wherein the lateral chutes open into a main chute.

9. Apparatus as defined in claim 2 wherein alternating collector pockets open at one side into respective lateral chutes.

10. Apparatus as defined in claim 1 wherein each said discharge channel is formed by a free space in the interior of the rotatable cutter.

11. Apparatus as defined in claim 10 wherein pressure channels for the admission of a flow medium toward the free space are associated with the feed channels.

12. Apparatus for granulating materials, which comprises
    a rotatable cutter having a cylindrical periphery with cutting blades thereon;
    a plurality of separate channels for feeding materials to the cylindrical periphery of said cutter, said channels being angularly offset relative to one another about the cylindrical periphery of said cutter;
    and means for limiting the further unwanted cutting of materials cut by said cutter, comprising a void in said cutter through which the materials cut thereby can fall.

* * * * *